United States Patent
Obara et al.

(10) Patent No.: US 6,855,214 B2
(45) Date of Patent: *Feb. 15, 2005

(54) ANTI-FRICTION BEARING (76) Inventors: Rikuro Obara, 4106-73 Oaza-Miyota Miyota-cho, Kitasaku-gun Nagano-ken (JP); Yutaka Daikuhara, 4106-73 Oazo-Miyota Miyota-cho, Kitasaku-gun Nagano-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 17 days.

(21) Appl. No.: 09/887,695

(22) Filed: Sep. 24, 2001

(65) Prior Publication Data

US 2002/0160223 A1 Oct. 31, 2002

Related U.S. Application Data (63) Continuation of application No. 09/608,260, filed on Jun. 30, 2000, now abandoned, which is a continuation-in-part of application No. 08/768,423, filed on Dec. 18, 1996, now abandoned.

(30) Foreign Application Priority Data

Dec. 29, 1995 (JP) .............................................. 7-353789

(51) Int. Cl.$^7$ ................................................ C22C 38/18
(52) U.S. Cl. ........................ 148/325; 148/326; 384/492
(58) Field of Search ................................. 148/325, 326, 148/529; 384/492

(56) References Cited

U.S. PATENT DOCUMENTS

| 5,030,017 A | * | 7/1991 | Murakami et al. | ........... 383/492 |
| 5,843,369 A | * | 12/1998 | Obara et al. | ................... 420/34 |

FOREIGN PATENT DOCUMENTS

EP 0592195 A1 * 4/1994

* cited by examiner

Primary Examiner—Melvyn Andrews
(74) Attorney, Agent, or Firm—Schulte Roth & Zabel; Joel Lutzker; Anna Vishey (57) ABSTRACT

An anti-friction bearing is provided which is low in vibration and excellent in quietness. The anti-friction bearing has rolling elements provided in inner and outer ring raceway grooves, which are made of martensitic stainless steel composed of 0.60 to 0.75 percent of carbon by weight, 10.5 to 13.5 percent of chromium by weight, 1.0 percent or less of silicon by weight and 0.3 to 0.8 percent of manganese by weight, the remainder of the composition being iron and inevitably introduced impurities, having a hardness of HRC 58 or higher, containing eutectic carbide particles of 10 microns or less in diameter, having oxygen and titanium concentrations of 10 ppm or less respectively, and less than 10 percent by volume of retained austenite.

21 Claims, 7 Drawing Sheets

Schematic of Anderon Meter Measurement

ANTI-FRICTION BEARING

This application is a continuation of U.S. patent application Ser. No. 09/608,260, filed Jun. 30, 2000 (now abandoned), which was in turn a continuation-in-part of U.S. patent application Ser. No. 08/768,423, filed Dec. 18, 1996 (now abandoned), and claims all rights of priority thereto.

BACKGROUND OF THE INVENTION

1. Field of the Invention

The present invention relates to an anti-friction bearing and, more particularly, to an anti-friction bearing which is suitable for a rotary support section of precision apparatus and equipment such as a computer peripheral device, a video tape recorder (VTR), a CD-ROM, and a laser beam printer.

2. Description of the Prior Art

Anti-friction bearings for a precision apparatus are used in, for example, a hard disk drive device (HDD) which is a computer peripheral device that enables a magnetic disk to be rotated at a high speed by means of a spindle motor. Anti-friction bearings are incorporated in a rotary support section of a spindle motor in a small hard disk drive device of 3.5 inches or smaller. For small hard disk drives anti-friction bearings called miniature bearings are used having a dimension of about 4 mm in inner diameter ×8 mm in outer diameter to 6 mm in inner diameter ×15 mm in outer diameter.

In recent years, the trend has been for the reduction in size of, and the increase in density of, a hard disk drive device. This has been especially true as the increase in density of a hard disk device of 3.5 inches or smaller has been rapidly progressing. In addition, with respect to a 2.5 inch hard disk drive device, such as those mounted in a notebook type personal computer for portable use, both line recording density and track density are high since a recording capacity similar to that of a large 3.5 inch hard disk device is required in spite of the fact that the 2.5 inch hard disk drive device is made thinner and the magnetic disk thereof is smaller in diameter. A high track density of 10 KTPI to 14 KTPI (TPI: track per inch) has been currently achieved in such devices. In addition, the magnetic disk component of these hard disk drives must rotate at higher revolutions in order to increase the data transmission rate. In 3.5 inch hard disk drive device, the magnetic disk revolves at high rates such as 5,400 to 7,200 rpm, and depending on the machine type, can exceed 10,000 rpm.

Because of these increased performance demands, hard disk drive manufacturers have been demanding a bearing, with improved vibration and acoustic characteristics when incorporated in spindle motors used in hard disk drives which operate at a high rate of revolutions. Bearings which are incorporated in spindle motors for hard disk drives are exposed to conditions under which the raceway grooves of the inner and outer rings and the rolling elements are repeatedly subjected locally to stress. Accordingly, surface roughness develops due to the rolling fatigue of the raceway groove faces and the surfaces of the rolling elements, resulting in an increase in vibration and deterioration of the acoustic characteristics and furthermore, shortening of the life of a bearing. Because of this, the inner and outer rings and rolling elements of a bearing are generally made of a high carbon chromium bearing steel (JIS-SUJ2 or one which corresponds to JIS-SUJ2) which has been quenched to achieve high hardness of HRC 58 to 64 as to the surface hardness in order to prevent the raceway groove faces and the faces of the rolling elements from being worn and/or damaged. However, since high carbon chromium bearing steel is poor in anti-corrosion property, the inner and outer rings are made of martensitic stainless steel (corresponding to JIS-SUS 440 C) in cases in which an anti-corrosion property is required.

Stainless steel has good anti-corrosion properties, however, when molten stainless steel is being solidified, Cr (chromium) in the steel is bound with C (carbon), thereby forming eutectic carbides, which tend to become large in crystal size.

When these large carbides exists on the rolling face of a bearing or the surface of a rolling element, it is difficult to obtain a high precision machine-finished surface due to the difference in hardness and cutting properties between these carbides and the metal matrix surrounding it, thereby reducing the quietness from the initial use of bearing.

The lack of precision of the machine-finished surface due to carbides can be corrected or rectified by additional finishing, grinding and cutting steps. Additional processing steps of grinding and cutting of a hard carbide, however, are not desirable because this leads to an increase in manufacturing cost.

Furthermore, eutectic carbide particles and the surrounding metal matrix have different anti-wearing properties, which may cause part of a eutectic carbide particle to brake off from the surface of the metal matrix during the rotation of a bearing. This difference in anti-wearing properties which can cause part of the eutectic carbide to brake off may disturb the surface configuration (surface roughness) of a bearing, becoming a cause for vibration of a bearing, thereby markedly reducing the quietness. Because of this, it is desired to reduce the size of the carbide particles as much as possible, and to prevent it from being unevenly distributed, in order to maintain the quietness of a bearing.

As for literature on conventional technology concerning stainless steel for which the size of these carbide particles are made small, mention may be made of Japanese Patent Gazette, Patent Publication No. Hei 5/1993-2734. This publication discloses an anti-friction bearing made of stainless steel consisting of 0.6 to 0.75% by weight of C, 0.1 to 0.8% by weight of Si, 0.3 to 0.8% by weight of Mn, 10.5 to 13.5% by weight of Cr, with the remainder being Fe and unavoidably mixed impurity/impurities, and eutectic carbides contained therein being 20 $\mu$m or less in the major axis and 10% or less in area ratio. It also discloses an anti-friction bearing made of stainless steel consisting of 0.6 to 0.75% by weight of C, 0.1 to 0.8% by weight of Si, 0.3 to 0.8% by weight of Mn, 10.5 to 13.5% by weight of Cr, with the remainder being Fe and unavoidably mixed impurity/impurities, and eutectic carbides contained therein being 10 $\mu$m or less in the major axis and 5% or less in area ratio.

In addition to carbide particles, other particles which are high in hardness may be formed in stainless steel, such as non-metallic inclusions which are formed through the binding of impurities in the raw material and gas dissolved in molten steel (such as nitrogen and oxygen). Ti (titanium) which is present as an impurity in the raw material, forms a non-metallic inclusion in the form of TiN (titanium nitride). TiN is high in hardness in comparison with the surrounding metal matrix, causing a similar problem to that caused by the above-mentioned carbide.

Additionally, with stainless steel, Si (silicon) and Al (aluminum), etc. are added as deoxidizing agents in order to remove oxygen dissolved in molten steel. Oxide type non-metallic inclusions such as $SiO_2$ and $Al_2O_3$ tend to be created by the bonding of oxygen with Si and Al. Since such oxide type non-metallic inclusions such as $SiO_2$ and $Al_2O_3$ are high in hardness in comparison with the surrounding metal matrix, a similar problem to that caused by the above-mentioned carbide may be caused. The above-mentioned Japanese Patent Gazette, Patent Publication No. Hei 5/1993-2734 discloses stainless steel for which the size of carbide particles is made as small as possible, however, no attention nor any consideration is given to non-metallic inclusions such as TiN, $SiO_2$ and $Al_2O_3$, and thus there exists a problem in achieving a finished surface with a high degree of precision.

As for literature regarding conventional technology concerning stainless steel for which the contents of Ti (titanium) and O (oxygen) which are elements which create such non-metallic inclusions, are reduced, mention may be made of U.S. Pat. No. 5,030,017.

U.S. Pat. No. 5,030,017 (the '017 patent) discloses an anti-friction bearing made of a bearing material obtained by applying a carbonizing heat treatment or a carbonizing-nitriding heat treatment to stainless steel for which the contents of Ti (titanium) and O (oxygen), which are elements which create non-metallic inclusions, are reduced to 40 ppm or less and 12 ppm or less respectively.

In the '017 patent, the upper limits of the Ti (titanium) and O (oxygen) contents are set forth and defined, however, the '017 patent relates to an anti-friction bearing whose field of utilization includes automobile, agricultural machinery and equipment, construction machinery and equipment, iron and steel machinery and equipment, etc., i.e. where the size of the bearing is greater than for a precision instrument such as a HDD. The bearing in the '017 patent is characterized in that the retained austenite quantity in the surface layer of the bearing is 10 to 25% by volume, and especially an anti-friction bearing of a long life for use in a transmission and an engine.

In high precision machines, especially a hard disk drive device, it is well known in the art that there are strict requirements on the vibration and acoustic characteristics. The stainless steel disclosed in U.S. Pat. No. 5,030,017 is not suitable as a material to be used in a bearing for use in rotary support section of a hard disk drive device because of its vibration and acoustic characteristics.

U.S. Pat. No. 5,639,168 discloses a ball bearing in which the anti-load property and anti-shock property have been improved by limiting the quantity of the retained austenite contained in the bearing steel or stainless steel constituting the raceway groove surface of a ball bearing to 2% by volume or less.

However, the ball bearing disclosed in the U.S. Pat. No. 5,639,168 does not pay any attention nor take into account any non-metallic inclusion such as TiN, $SiO_2$ and $Al_2O_3$, and thus there exists a problem in achieving a finished surface of a high degree of precision of the raceway groove surface of an anti-friction bearing, and in improving the quietness thereof. The ball bearing of U.S. Pat. No. 5,639,168 does not limit the amount of Ti or O.

SUMMARY OF THE INVENTION

The present invention is directed to anti-friction bearings, such as rolling bearings and sleeve bearings.

The performance of a bearing is affected by the presence of retained austenite which decomposes over time and under the stress which is applied to a bearing while the bearing rotates. When retained austenite decomposes, a volume expansion tends to take place causing a variation in dimension of a bearing. This variation in dimension reduces the precision in shape or configuration of the rotating faces of a bearing, causing vibration, and consequently reducing its acoustic characteristics. As a result, an anti-friction bearing to be used for a rotary support section of a hard disk drive device or other high precision equipment, should have a reduced quantity of retained austenite.

The anti-friction bearing in accordance with the present invention has been achieved by taking into account the above-mentioned problems. Objects of the present invention include to provide a precision sized anti-friction bearing for use in equipment such as HDDs, with a long life, which is excellent in quietness by making the size of carbides in martensitic stainless steel as small as possible and also by limiting and restricting the creation of non-metallic inclusions as much as possible. It is a further object to provide an anti-friction bearing which does not deteriorate in acoustic characteristics due to the decomposition of retained austenite by reducing the quantity of retained austenite as much as possible.

In order to achieve the above-mentioned objects of the invention, the anti-friction bearing in accordance with a first embodiment of the invention comprises an inner ring on the outer peripheral surface of which there is provided an inner raceway groove, an outer ring on the inner peripheral surface of which there is provided an outer raceway groove, and a plurality of rolling elements held between the above-mentioned inner raceway groove and the above-mentioned outer raceway groove by means of a holding device; which anti-friction bearing is characterized in that the above-mentioned inner ring and outer ring are made of martensitic stainless steel composed of 0.60 to 0.75% of carbon by weight, 10.5 to 13.5% of chromium by weight, 1.0% or less of silicon by weight, and 0.3 to 0.8% of manganese by weight; the remainder of the composition being iron, containing eutectic carbide particles of 10 μm or less in diameter, having oxygen and titanium concentrations of 10 ppm or less respectively, having a surface hardness of HRC 58 or higher, and the quantity of retained austenite is less than 10% by volume.

An anti-friction bearing in accordance with a second embodiment of the invention comprises an inner ring having a cylindrical form, a stepped shaft having a larger diameter section and a smaller diameter section, and an inner ring which is fitted to said small diameter section, a pair of outer raceway grooves formed on the inner peripheral surface of the above-mentioned cylindrical outer ring, an inner raceway groove formed respectively on the outer peripheral surface of the above-mentioned larger diameter section and on the outer peripheral section of the above-mentioned inner ring, and there are provided a plurality of rolling elements held between the above-mentioned inner raceway groove and the above-mentioned outer raceway grooves; which anti-friction bearing is characterized in that the above-mentioned inner ring and outer ring and the above-mentioned shaft are made of martensitic stainless steel, composed of 0.60 to 0.75% of carbon by weight, 10.5 to 13.5% of chromium by weight, 1.0% or less of silicon by weight, and 0.3 to 0.8% of manganese by weight; the remainder of the composition being iron, containing eutectic carbide particles of 10 μm or less in diameter, having oxygen and titanium concentrations of 10 ppm or less respectively, having a surface hardness of HRC 58 or higher, and the quantity of retained austenite is less than 10% by volume.

In another form of the invention, the rolling elements may be made of high carbon chromium bearing steel.

The effects of the compositional elements and their limiting values are as follows:

Carbon (C) is an element which is required to maintain the hardness after quenching and tempering. However, if the carbon content is too high, large carbides tend to be created, and the workability and quietness are reduced. Therefore, the carbon content is limited to 0.75% by weight or less. On the other hand, if the carbon content is too small, hardness by quenching and tempering cannot be sufficiently secured, and therefore the carbon content is limited to 0.6% by weight or higher.

Chromium (Cr) forms a carbide by being bound to C, thereby increasing the anti-wearing property. Chromium which has formed a solid solution with a metal matrix also improves the anti-corrosion property. For this, a content of chromium of 10.5% by weight or higher is required. However, if the content of chromium is too high, the heat treatment hardness decreases, and therefore, in view of the relation with the content of carbon, chromium, should not be greater than 13.5% by weight.

Silicon (Si) acts as a deoxidizing agent and is also effective for improvement of tempering softening resistance and solid solution strengthening. However, if the content of silicon is too high, cutting properties become deteriorated. Therefore, the amount of silicon should be 1.0% by weight or less.

Manganese (Mn) is effective for improvement of quenching property. However, if the content of manganese becomes too high, the quantity of retained austenite becomes high, and the heat treatment hardness is reduced. Therefore, manganese should be in the amount of 0.3 to 0.8% by weight.

Since titanium (Ti) is present as an impurity, and since a non-metal compound is formed in the form of TiN (titanium nitride), which is high in hardness, it is necessary to reduce the content of titanium as much as possible. Because of this, the content of titanium should be 10 ppm or less.

Since O (oxygen) becomes an element for the formation of an oxide series non-metallic inclusion such as $SiO_2$ and $Al_2O_3$, it becomes necessary to reduce the content of oxygen as much as possible. Because of this, the content of oxygen should be 10 ppm or less.

In addition, since eutectic carbide particles are high in hardness in comparison with the surrounding metal matrix, it is difficult to obtain a high precision machine-finished surface due to the difference in properties when a high precision part is cut and ground from the surrounding metal matrix and thus the quietness of a bearing is reduced. Therefore, the size of eutectic carbide particles should be reduced as much as possible, with the diameter thereof being 10 μm or less.

Additionally, as to surface hardness, the surface hardness should be HRC 58 or higher since it becomes inferior in noise and quietness and the life of a bearing becomes short if it is less than HRC 58.

Furthermore, retained austenite decomposes over time and under the stress which is applied to a bearing when the bearing rotates. When retained austenite decomposes a volume expansion tends to occur affecting the precision in shape and configuration of the rolling faces. This results in undesirable effects such as vibration and consequently the acoustic characteristics are reduced. Therefore, as will shown in the examples embodying the present invention which will be described later, the quantity of the retained austenite is made to be less than 10% by volume in view of the acoustic characteristics of a bearing. In fact, the retained austenite may be less than 3% or even less than 2%.

DETAILED DESCRIPTION OF THE PREFERRED EMBODIMENTS

Specific embodiments of anti-friction bearings in accordance with the present invention will now be described by referring to the drawings attached hereto.

Figure 1:
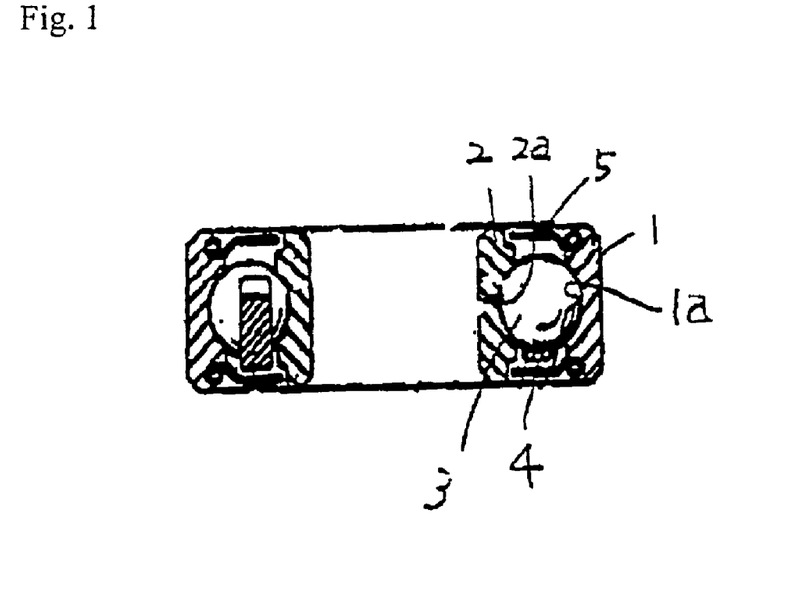
FIG. 1. is a lengthwise cross sectional view which shows an anti-friction bearing in accordance with a first embodiment of the present invention.

Referring to FIG. 1, reference numeral 1 denotes an outer ring which forms an outer raceway groove 1a on the inner periphery thereof, 2 is an inner ring which forms an inner raceway groove 2a on the periphery thereof. A plurality of balls 3 are provided as rolling elements between the raceway grooves of the inner and outer rings. Reference numeral 4 denotes a holding device, and 5 is a seal plate, which is not needed in all cases.

In this first embodiment of the present invention, the outer ring 1 and the inner ring 2 of a ball bearing are made of a specific stainless steel to be described below, and the balls 3 are made of a high carbon chromium bearing steel. The stainless steel constituting the inner and outer rings is a martensitic stainless steel which is composed of 0.6 to 0.75% by weight of carbon (C), 10.5 to 13.5% by weight of chromium (Cr), 1.0% by weight or less of silicon (Si), 0.3 to 0.8% by weight of manganese (Mn), with the remainder being iron (Fe), and the diameter of eutectic carbide particles contained therein being 10 μm or less, the contents of oxygen (O) and titanium (Ti) in the steel material being respectively 10 ppm or less, the surface hardness being HRC 58 or higher, and the quantity of retained austenite being less than 10% by volume.

Figure 2:
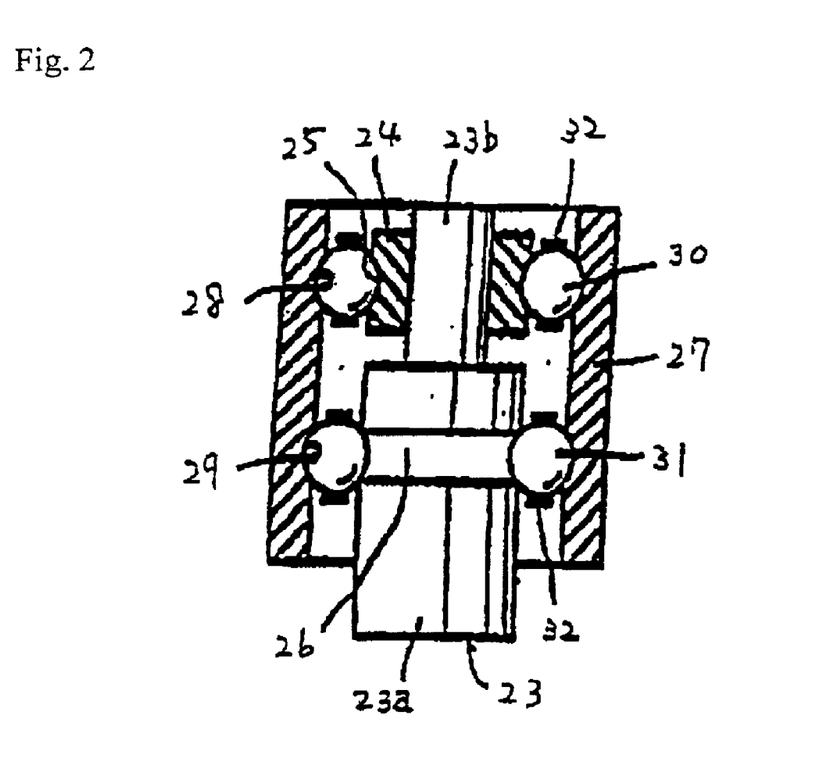
FIG. 2 is a lengthwise cross sectional view which shows an anti-friction bearing in accordance with a second embodiment of the present invention.

Referring to FIG. 2, a second embodiment of the present invention is shown in which the anti-friction bearing is a compound bearing wherein a spindle shaft 23 consists of a 2-step shaft of a larger diameter section 23a and a smaller diameter section 23b. This embodiment has a first inner raceway groove 25 on the outer peripheral face of an inner ring 24 which is fitted to and adhered to the smaller diameter section 23b, and a second inner raceway groove 26 which is formed directly on the outer peripheral face of the larger diameter section 23a, and two parallel rows of a first outer raceway groove 28 and a second outer raceway groove 29 on the inner peripheral face of the sleeve-shaped outer ring 27 which encloses the spindle shaft 23, and a first row of balls 30 are arranged between the first inner raceway groove 25 and the first outer raceway groove 28, a second row of balls 31 being arranged between the second inner raceway groove 26 and the second outer raceway groove 29 and the balls 30 and 31 of the respective rows being held by means of holding members 32.

In the anti-friction bearing described in the second embodiment, the above-mentioned sleeve-shaped outer ring 27, the above-mentioned spindle shaft 23 and the above-mentioned inner ring 24 are made of the stainless steel having the same composition as that for the anti-friction bearing described in the first embodiment.

In each of the above-mentioned embodiments of the present invention, the balls, which are the rolling elements of the bearing, are made of a high carbon chromium bearing steel. However, the balls may be made of the same stainless steel as that used for the inner ring and the outer ring, or for the inner ring, the outer ring and the shaft.

With respect to the embodiments described above, tests were performed to evaluate vibration and noise (quietness).

In Table 1 are given the content of titanium and oxygen, the hardness of the inner ring and the outer ring, and the quantity of the retained austenite in the inner ring and the outer ring for each of Sample A and Comparative Samples B and C. Sample A is an anti-friction bearing made in accordance with the present invention, and Samples B and C are comparative examples which are not in accordance with the present invention. Comparative Sample B contains retained austenite in a larger quantity than Sample A and larger than that called for in the present invention. Comparative Sample C has a composition similar to that of the martensite series stainless steel of the type disclosed in the Japanese Patent Gazette, Patent Publication No. Hei 5/1993-2734, but the content of titanium (Ti) and oxygen (O) in the stainless steel are respectively set to be 13 ppm and 30 ppm.

Furthermore, all of the balls, which are the rolling elements of the anti-friction bearings of the respective samples, are made of a high carbon chromium bearing steel (JIS-SUJ 2). The balls are made of high carbon chromium bearing steel (JIS-SUJ 2), since anti-corrosion property is not much of a concern since the balls are surrounded by an inner ring and outer ring. Furthermore, high carbon chromium bearing steel can be easily machined and finished in comparison with stainless steel, and thus it is possible to obtain a sufficient degree of precision in the machined and finished surface. Furthermore, because any influence or effect on a test result arising from a ball may be eliminated, a model may be simplified, and any difference in material between an inner ring and an outer ring in each sample to be tested can be clarified and distinguished.

TABLE 1

| Sample | Content of titanium | Content of oxygen | Hardness of the inner ring and the outer ring | Quantity of retained austenite in the inner ring and the outer ring |
|---|---|---|---|---|
| Sample A (present invention) | 9 ppm | 9 ppm | HRC 61 | 3% by vol. |
| Comparative Sample B (example for comparison) | 9 ppm | 9 ppm | HRC 59 | 13% by vol. |
| Comparative Sample C (example for comparison) | 13 ppm | 30 ppm | HRC 61 | 3% by vol. |

The quantity of the retained austenite in the stainless steel is adjusted by the heat treatment condition. In the following, we explain the heat treatment conditions for each of Sample A and Comparative Samples B and C.

Sample A and Comparative Sample C were heat treated under a condition of 1040° C. for 1 hour and oil quenched, then subjected to a sub-zero treatment under a condition of −80° C. for 1 hour, and then tempered under a condition of 170° C. for 2 hours. By this treatment, the quantity of the retained austenite was made approximately the same for both Sample A and Comparative Sample C. Comparative Sample B, which was made of the same starting material as Sample A, was heat treated under a condition of 1040° C. for 1 hour and oil quenched, then tempered under a condition of 170° C. for 1 hour. Thus, Comparative Sample B, which contains a larger quantity of retained austenite than Sample A and Comparative Sample C, was prepared without carrying out a sub-zero treatment.

Table 2 shows the results of the measurement of the surface roughness of the raceway grooves for each of the outer rings of Sample A and Comparative Sample C, measured by use of a Talysurf (product name) made by Rank Taylor Hobson Inc.

TABLE 2

| Sample | Surface roughness Ra (μm) |
|---|---|
| A (present invention) | 0.006 |
| C (example for comparison) | 0.007 |

As shown in Table 2, the surface roughness of Sample A is less than that of Comparative Sample C. This is a result of the reduction in the formation of non-metallic inclusions in Sample A in comparison with Comparative Sample C due to the reduction in titanium and oxygen in Sample A.

Figure 3:
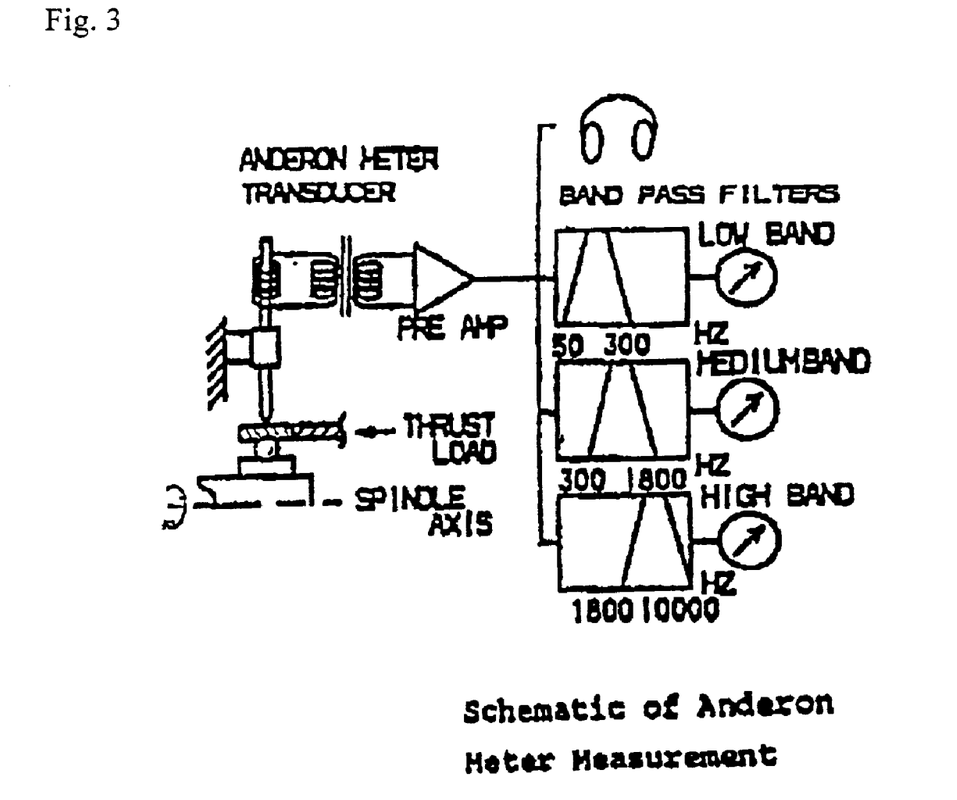
FIG. 3 is a drawing which shows the configuration of a test apparatus to be used in measurement and testing by means of an Anderon meter.
Figure 4:
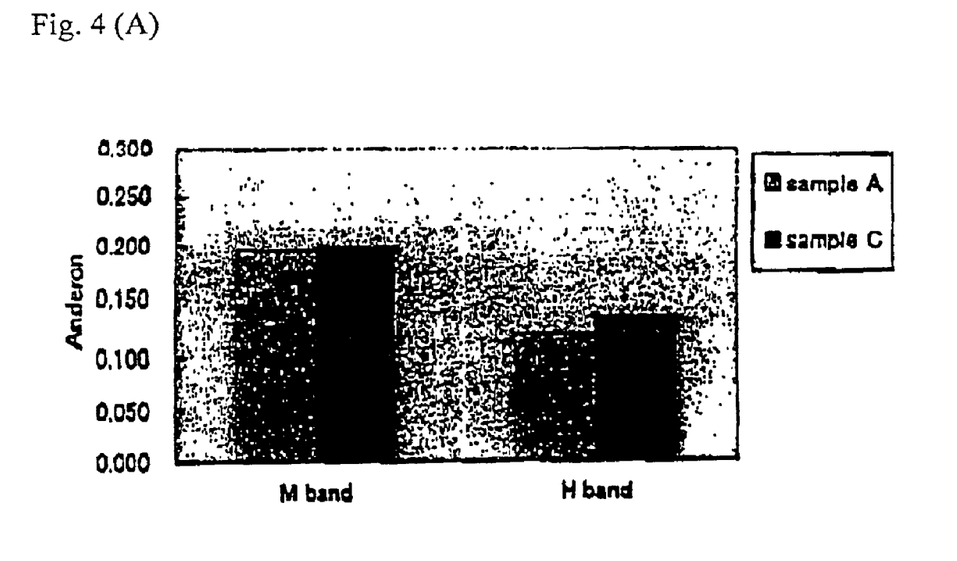
FIG. 4(A) is a graph which shows measurement results of the Anderon values of Sample A and Comparative Sample C.
FIG. 4(B) is a graph which shows measurement results of the Anderon values of Sample A and Comparative Sample B.

FIG. 4(A) and FIG. 4(B) show the results of the measurement of vibration and noise (quietness) by way of the Anderon values of the vibration of each sample. The measurements were made by means of an Anderon meter configured in the measurement apparatus as shown in FIG. 3. The measurement technique was based on the ABMA (The Anti-Friction Bearing Manufacturers Association, Inc. Standard).

FIG. 4(A) shows and compares the Anderon values of Sample A and Comparative Sample C, which differ in the amount of titanium and oxygen in the steel materials. FIG.

4(B) shows and compares the Anderon values of Sample A and Comparative Sample B, which contain different quantities of retained austenite.

In FIG. 4(A) and FIG. 4(B) the Anderon values shown as M band and H band correspond to a medium frequency band (300 to 1800 Hz), and a high frequency band (1800 to 10,000 Hz), respectively. The smaller the Anderon value, the less vibration and noise, and the more superior the quietness.

As shown in FIG. 4(A), it can be seen that Sample A, made in accordance with the present invention in which the quantities of titanium and oxygen are reduced so as to limit the creation of non-metallic inclusions, has an Anderon value which is smaller than the Anderon value of Comparative Sample C, in which the amount of oxygen and titanium is not reduced, and is smaller in vibration and noise, and superior in quietness.

In addition, as shown in FIG. 4(B), Comparative Sample B, which is similar to Sample A in that the quantities of titanium and oxygen are reduced, but which contains a larger quantity of retained austenite, has a larger Anderon value, and consequently is poor in quietness, in comparison with Sample A, which has a reduced level of retained austenite.

Therefore, it can be seen that Sample A, which is made in accordance with the present invention, in which the contents of titanium and oxygen in the steel material are reduced and the quantity of the retained austenite is also reduced, has less vibration and noise, and is superior in quietness in comparison to Comparative Samples B and C.

Figure 5:
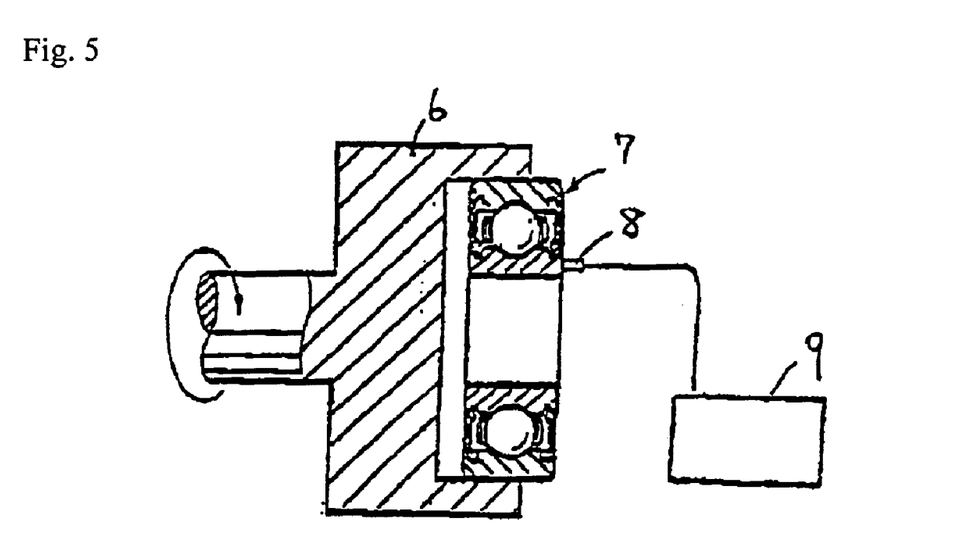
FIG. 5 is a drawing which shows the configuration of a testing apparatus used to measure the acceleration of vibration.
Figure 6:
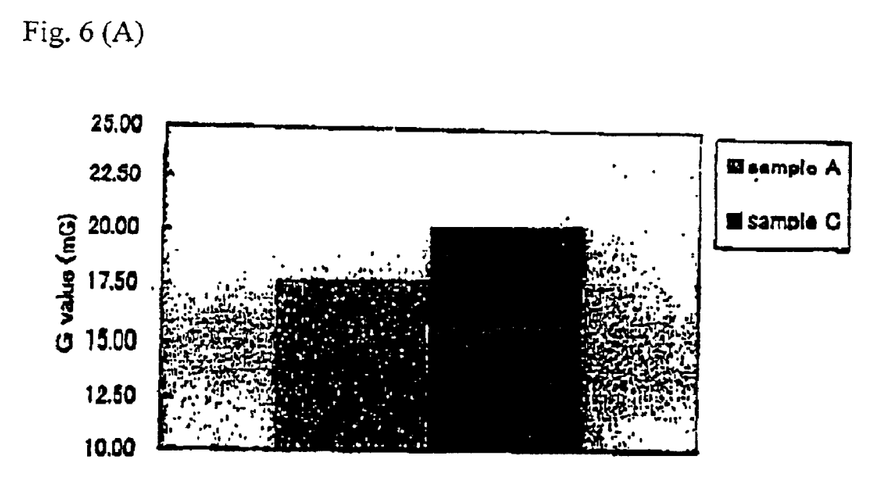
FIG. 6(A) is a graph which shows measurement results of the values of acceleration (G value) of Sample A and Comparative Sample C.
FIG. 6(B) is a graph which shows measurement results of the values of acceleration (G value) of Sample A and Comparative Sample B.

FIG. 5 shows the configuration of apparatus for measuring the vibration of the test samples by means of an accelometer. Each test sample 7 is set in the rotary arm 8 of the test apparatus. While the outer ring is rotated at a rate of 1800 rpm, a measuring probe 8 is pressed against the edge surface of the inner ring from the axial direction, and the acceleration (G value) of the vibration of each test sample is measured by means of a vibro-meter 9. FIG. 6(A) and FIG. 6(B) show the vibration test results measured with the accelometer.

FIG. 6(A) compares the acceleration values (G values) of Sample A and Comparative Sample C, which differ in the amount of titanium and oxygen in the steel materials. FIG. 6(B) compares the acceleration values (G values) of Sample A and Comparative Sample B, which contain different quantities of retained austenite in the steel material. The smaller the G values, the less vibration and the greater the quietness.

As shown in FIG. 6(A) it can be seen that Sample A, made in accordance with the present invention in which the quantities of titanium and oxygen are reduced so as to limit the creation of non-metallic inclusions, has a small G value in comparison with Sample C which does not have reduced quantities of titanium and oxygen. Accordingly, Sample A is superior in quietness in comparison with Comparative Sample C.

As shown in FIG. 6(B), Comparative Sample B, which has reduced quantities of titanium and oxygen similarly to Sample A, but which contains a larger quantity of retained austenite, has a large G value in comparison with Sample A, and consequently is poor in quietness, in comparison with Sample A.

Therefore, it can be seen that Sample A, in which the contents of titanium and oxygen in the steel material are reduced, and the quantity of the retained austenite is also reduced, has less vibration, and is superior in quietness in comparison to the comparative samples.

Figure 7:
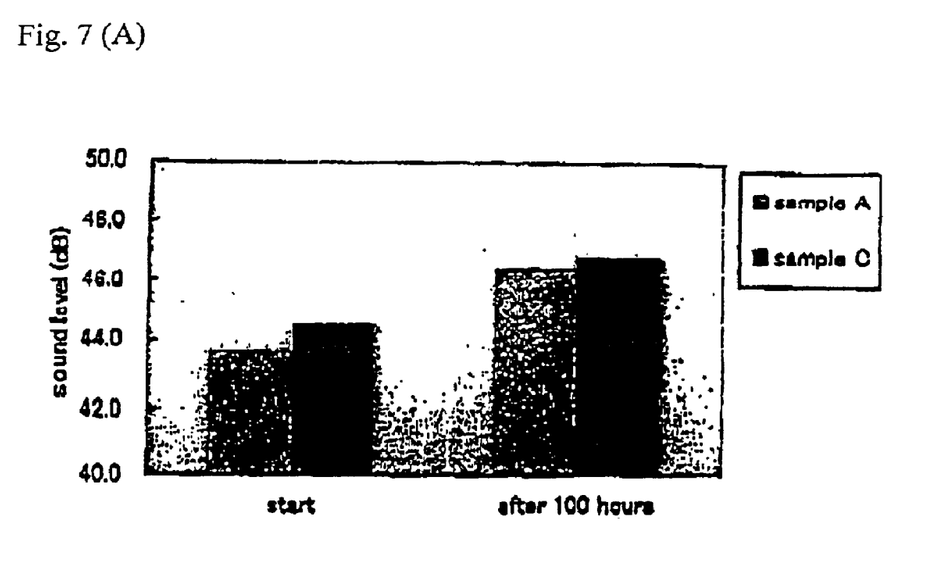
FIG. 7(A) is a graph which shows measurement results of the acoustic characteristics of Sample A and Comparative Sample C.
FIG. 7(B) is a graph which shows measurement results of the acoustic characteristics of Sample A and Comparative Sample B.

FIG. 7(A) and FIG. 7(B) are graphs obtained through the measurement of the levels of the sound pressure by incorporating each sample tested in the rotary section of a motor. FIG. 7(A) compares the level of the sound pressure of the motors which used Sample A and Comparative Sample C, which differ in the amount of titanium and oxygen in the steel material. FIG. 7(B) compares the level of the sound pressure of the motors which used Sample A and Comparative Sample B, which differ in the quantity of retained austenite in the steel material. The smaller the level of the sound pressure, the less noise and the more superior the quietness.

FIG. 7(A) shows the results of a life test conducted using Sample A and Comparative Sample B. In the life test, first each test sample was incorporated in a motor and the level of the sound pressure at the initial stage of revolutions was measured. Then each test sample was removed from the motor, and subjected to 100 hours of rotation and operation by use of a Gakushin type ball bearing life testing machine, model II. Then each of the test samples was again incorporated in the motor, and the level of the sound pressure was measured. For the life testing, the outer ring was rotated at a rate of 7200 rpm, at a temperature of 60° C., and at a pressure of 1.2 kg f.

As shown in FIG. 7(A), it was found that the motor which used Sample A, in which titanium and oxygen contents are reduced, gives a low level of the sound pressure, that is to say, low noise levels and excellent quietness in comparison with the motor which used Comparative Sample C, and that even after the 100 hours of operation, the quietness of Sample A is superior to that of Comparative Sample C.

As shown in FIG. 7(B), Comparative Sample B, which has reduced quantities of titanium and oxygen similarly to Sample A, but which contains a larger quantity of retained austenite, has a high level of the sound pressure, and is poor in quietness, in comparison with the motor which used Sample A.

Therefore, it can be seen that the motor which used Sample A, which has reduced amounts of titanium and oxygen in the steel material, and lower quantity of retained austenite, is lower in noise, and superior in quietness in comparison to the Comparative Samples.

As can be seen and understood from the results of the respective tests, Sample A, which is in accordance with the present invention in which the respective contents of titanium and oxygen which are involved in the creation of non-metallic inclusions, are 10 ppm or less, produces small vibration and low noises, and is superior in quietness in comparison with Comparative Sample C, which contains larger quantities of titanium and oxygen. It has, therefore, been found that if the contents of titanium and oxygen in stainless steel, which are involved in the creation of non-metallic inclusions, are reduced to 10 ppm or less respectively, an anti-friction bearing is obtained which satisfies the performance and requirements required of a bearing to be mounted on a small hard disk drive device which is made small in size and high in density.

Similarly to Sample A, Comparative Sample B also contains titanium and oxygen in the quantities of 10 ppm or less respectively, however, the quantity of retained austenite in Comparative Sample B, is 13% by volume, which is higher than that of Sample A. Because of this higher level of retained austenite, even if the contents of titanium and oxygen in stainless steel are reduced, an anti-friction bearing made of stainless steel for which the quantity of the retained austenite is large experiences deterioration in precision in configuration and shape of the rolling faces of the inner ring and the outer ring due to the decomposition of the retained austenite, and as a result, vibration and noise of the anti-friction bearing become large. Accordingly, the performance which is required of a bearing to be mounted in a small hard disk drive device which is made small in size and high in density cannot be satisfied by such bearings with high levels of retained austenite.

As explained in the above, the anti-friction bearing made in accordance with the present invention is excellent in precision in rotation and quietness, and is appropriate for support of a rotary section of a computer periphery equipment such as a hard disk drive device.

Some specific examples of a spindle motor and a swing arm for a hard disk drive device in which the anti-friction bearing in accordance with the present invention is incorporated will now be described.

Figure 8:
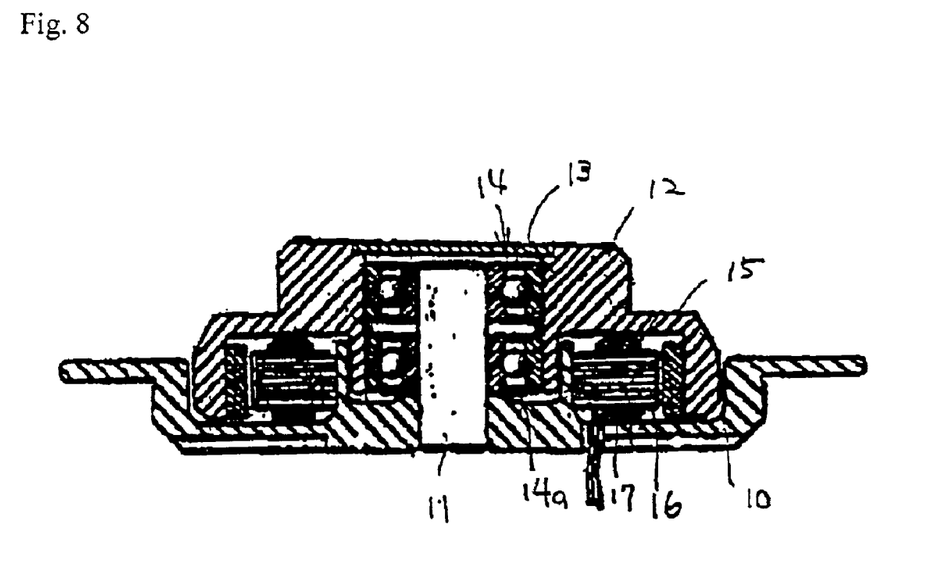
FIG. 8 is a lengthwise cross sectional view of a spindle motor for a hard disk drive device which is equipped with the anti-friction bearing in accordance with a first embodiment of the present invention.

FIG. 8 shows a specific example of a spindle motor for a hard disk drive device in which the anti-friction bearing of the first embodiment is incorporated. This spindle motor is a so-called outer rotor type motor, in which a pair of upper and lower ball bearings 14 and 14a are placed between the outer peripheral face of the spindle shaft 11 fixed standing onto the base 10 and the inner face of the hole 13 of the rotor hub 12, so that the rotor hub 12 may be allowed to freely rotate. The symbol 15 used in FIG. 8 denotes a magnet, and the symbol 16 denotes a stator. When an electric current is allowed to flow through the coil 17 which is wound around the stator 16, the rotor hub 12 is rotated.

Figure 9:
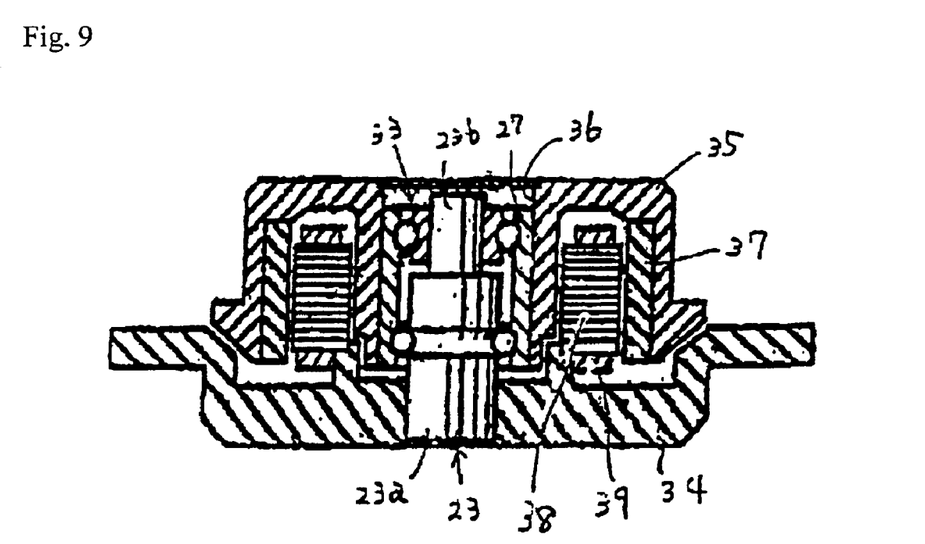
FIG. 9 is a lengthwise cross sectional view of a spindle motor for hard disk drive device which is equipped with the anti-friction bearing in accordance with a second embodiment of the present invention.

FIG. 9 shows a specific example of a spindle motor for a hard disk drive device in which the anti-friction bearing of the second embodiment is incorporated. In this spindle motor, the larger diameter section 23a of the spindle shaft 23 in the compound bearing 33 having the above-mentioned structure is placed standing on the base 34, and the sleeve-shaped outer ring 27 of the compound bearing 33 is fitted into the inner peripheral face of the hole 36 of the rotor hub 35 so that the rotor hub 35 may be allowed to freely rotate. The symbol 37 used in FIG. 9 denotes a magnet, and the symbol 38 used therein denotes a stator. When an electric current is allowed to flow through the coil 39 which is wound around the stator 39, the rotor hub 35 is rotated.

Figure 10:
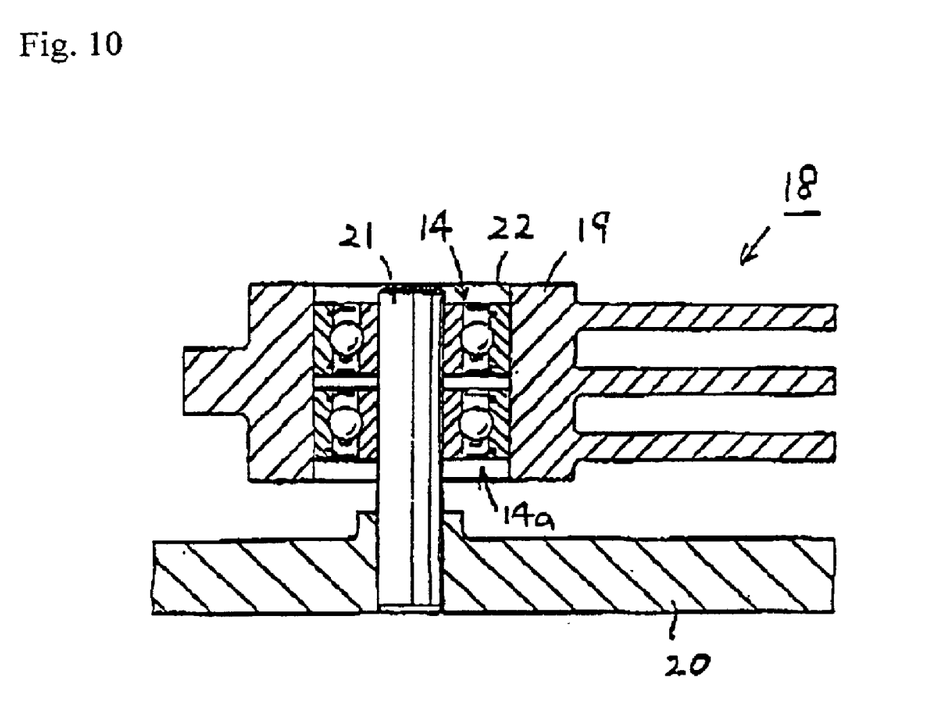
FIG. 10 is a lengthwise cross sectional view of a swing arm for hard disk drive device which is equipped with the anti-friction bearing in accordance with a first embodiment the present invention.

FIG. 10 shows a specific example of a swing arm for a hard disk drive device in which the anti-friction bearing of the first embodiment is incorporated. In FIG. 10, the symbol 18 denotes a swing arm, 19 is a boss for the above-mentioned swing arm, upper and lower pairs of ball bearings 14 and 14a are placed and arranged between the outer peripheral face of the shaft 21 fixed standing on the base 20 of the hard disk drive device and the central lengthwise hole 22 of the above-mentioned boss 19 in the swing arm so as to support the swing arm to be able to rotate around the shaft 21.

Figure 11:
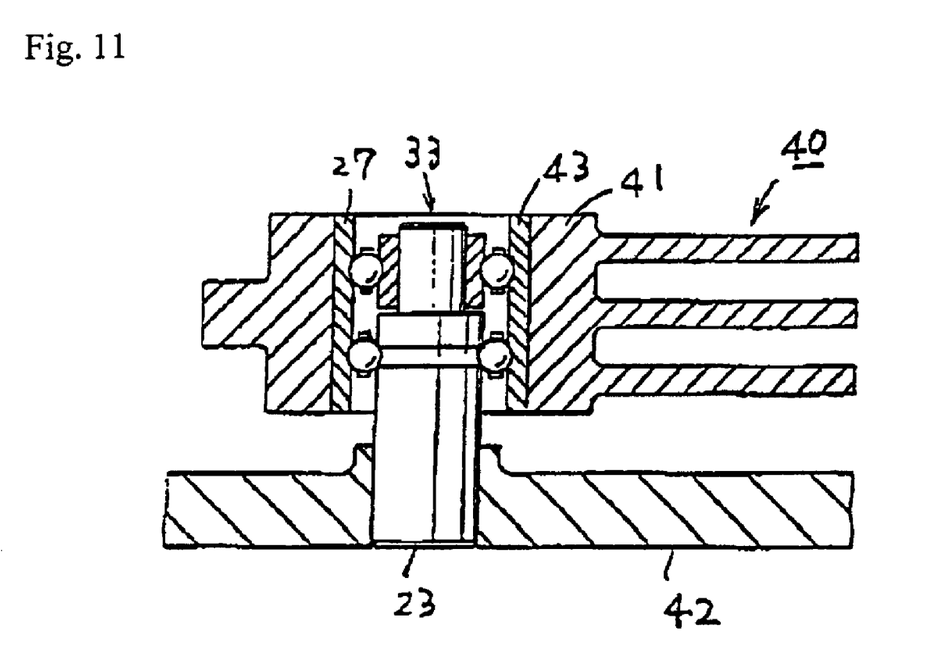
FIG. 11 is a lengthwise cross sectional view of a swing arm for hard disk drive device which is equipped with the anti-friction bearing in accordance with a second embodiment of the present invention.

FIG. 11 shows a specific example of a swing arm for a hard disk drive device in which the anti-friction bearing of the second embodiment is incorporated. In FIG. 11, the symbol 40 denotes a swing arm, 41 is a boss for the above-mentioned swing arm, the spindle shaft 23 of the compound bearing 33 is fixed standing on the base 42 of the hard disk drive device and the central lengthwise hole 43 of the above-mentioned boss 41 in the swing arm is fitted in the sleeve-shaped outer ring 27 of this compound bearing 33 so that the swing arm 40 may be able to rotate around the spindle shaft 23.

As mentioned above, since, in an anti-friction bearing made in accordance with the present invention, both titanium and oxygen contained in the steel material of stainless steel are respectively limited to 10 ppm or less, thereby limiting or restricting the creation of non-metallic inclusions as much as possible, the texture of the steel material is uniform and dense. This allows the machining and finishing of a anti-friction bearing to be made with a high degree of precision, and thus it is possible to improve the quietness and the precision in rotation of a anti-friction bearing.

In addition, since non-metallic inclusions in stainless steel are hard in comparison with the matrix of the steel material, non-metallic inclusions which appear on the surface of a rolling groove become a cause for wearing of the surface of a rolling element in use in the case of an anti-friction bearing made of conventional stainless steel. However, with an anti-friction bearing made in accordance with the present invention, the amount of non-metallic inclusions is limited to an extremely low level, and therefore, wear of a rolling element is small, and thus it is possible to prolong the life of an anti-friction bearing.

Furthermore, with the anti-friction bearing made in accordance with the present invention, as the quantity of retained austenite present is limited to 10% by volume or less, deterioration in precision in the configuration and shape of a rolling face due to the decomposition of retained austenite tends not to take place, and thus it becomes possible to achieve an anti-friction bearing of high performance which is low in vibration, excellent in quietness, and allows the high rotary precision to be maintained for a long period of time. The retained austenite level may be 3% or less, or even 2% or less.

Therefore, the anti-friction bearing made in accordance with the present invention is appropriate and suitable for a rotary support section of precision machinery and equipment, and especially when the anti-friction bearing made in accordance with the present invention is used as a bearing for a spindle motor of a small hard disk drive device, it is possible to realize a small size hard disk drive device of a high recording density, and a high data transmission rate.

What is claimed is:

1. An anti-friction bearing for a rotary support section of a computer peripheral device wherein at least one component is made of martensitic stainless steel composed of 0.60 to 0.75% by weight carbon, 10.5 to 13.5% by weight chromium, 1.0% by weight or less silicon, 0.3 to 0.8% by weight manganese, the remainder of the composition being iron and inevitably introduced impurities, containing eutectic carbide particles of 10 μm or less in diameter, having titanium and oxygen concentrations of 10 ppm or less respectively, having a hardness of HRC 58 or higher, and having more than 0% and less than 10% by volume retained austenite.

2. An anti-friction bearing as claimed in claim 1, wherein said anti-friction bearing is a rolling bearing.

3. An anti-friction bearing as claimed in claim 1, wherein said antifriction bearing is a sleeve bearing.

4. An anti-friction bearing as claimed in claim 1, wherein said martensitic stainless steel has 3% or less by volume retained austenite.

5. An anti-friction bearing as claimed in claim 1, wherein said martensitic stainless steel has less than 2% by volume retained austenite.

6. An anti-friction bearing for a rotary support section of a computer peripheral device comprising a plurality of rolling elements provided in raceway grooves formed in an inner and an outer ring; said anti-friction bearing characterized in that at least one of said inner ring and outer ring are made of martensitic stainless steel composed of 0.60 to 0.75% by weight carbon, 10.5 to 13.5% by weight chromium, 1.0% by weight or less silicon, 0.3 to 0.8% by weight manganese, the remainder of the composition being iron and inevitably introduced impurities, containing eutectic carbide particles of 10 μm or less in diameter, having titanium and oxygen concentrations of 10 ppm or less respectively, having a hardness of HRC 58 or higher, and having more 0% and less than 10% by volume retained austenite.

7. An anti-friction bearing for a rotary support section of a computer peripheral device comprising a plurality of rolling elements provided in raceway grooves formed in an inner and an outer ring; said anti-friction bearing having a stepped shaft having a larger diameter section and a smaller diameter section and a cylindrical outer ring, wherein an inner ring is fitted to said small diameter section, a pair of outer ring raceway grooves being formed on the inner peripheral surface of said cylindrical outer ring, inner ring raceway grooves formed respectively on the outer peripheral surface of said larger diameter section and on the outer peripheral section of said inner ring, said anti-friction bearing characterized in that said inner ring and outer ring and shaft are made of martensite stainless steel composed of 0.60 to 0.75% by weight carbon, 10.5 to 13.5% by weight chromium, 1.0% by weight or less silicon, 0.3 to 0.8% by weight manganese, the remainder of the composition being iron and inevitably introduced impurities, containing eutectic carbide particles of 10 μm or less in diameter, having titanium and oxygen concentrations of 10 ppm or less respectively, having a hardness of HRC 58 or higher, and having more than 0% and less than 10% by volume retained austenite.

8. An anti-friction bearing as claimed in claim 6, wherein said rolling elements are made of a high carbon chromium bearing steel.

9. An anti-friction bearing, as claimed in claim 7, wherein said rolling elements are made of a high carbon chromium bearing steel.

10. An anti-friction bearing as claimed in claim 1, wherein said anti-friction bearing has an improved acoustic characteristic.

11. An anti-friction bearing as claimed in claim 1, wherein said anti-friction bearing has a reduced vibration characteristic.

12. An anti-friction bearing as claimed in claim 6, wherein said antifriction bearing is for a rotary support section of a hard disk drive device.

13. An anti-friction bearing as claimed in claim 7, wherein said antifriction bearing is for a rotary support section of a hard disk drive device.

14. An anti-friction bearing as claimed in claim 6, wherein said anti-friction bearing is for a spindle motor of a hard disk drive device.

15. An anti-friction bearing as claimed in claim 7, wherein said anti-friction bearing is for a spindle motor of a hard disk drive device.

16. An anti-friction bearing as claimed in claim 6, wherein said anti-friction bearing is for a swing arm of a hard disk drive device.

17. An anti-friction bearing as claimed in claim 7, wherein said anti-friction bearing is for a swing arm of a hard disk drive device.

18. An anti-friction bearing as claimed in claim 6, wherein said anti-friction bearing has an improved acoustic characteristic.

19. An anti-friction bearing as claimed in claim 6, wherein said anti-friction bearing has a reduced vibration characteristic.

20. An anti-friction bearing as claimed in claim 7, wherein said anti-friction bearing has an improved acoustic characteristic.

21. An anti-friction bearing as claimed in claim 7, wherein said anti-friction bearing has a reduced vibration characteristic.

* * * * *